US011967346B1

(12) United States Patent
Marcin et al.

(10) Patent No.: US 11,967,346 B1
(45) Date of Patent: Apr. 23, 2024

(54) SYSTEMS AND METHODS FOR IDENTIFYING EVENTS IN VIDEOS

(71) Applicant: GoPro, Inc., San Mateo, CA (US)

(72) Inventors: Téo Marcin, San Mateo, CA (US); Charles Laroche, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 143 days.

(21) Appl. No.: 17/695,535

(22) Filed: Mar. 15, 2022

(51) Int. Cl.
*G11B 27/13* (2006.01)
*G06V 20/50* (2022.01)

(52) U.S. Cl.
CPC .............. *G11B 27/13* (2013.01); *G06V 20/50* (2022.01)

(58) Field of Classification Search
None
See application file for complete search history.

(56) References Cited

U.S. PATENT DOCUMENTS

2016/0225410 A1* 8/2016 Lee .................. H04N 21/21805
2018/0211355 A1* 7/2018 Newman ............. H04N 23/661

* cited by examiner

*Primary Examiner* — Heather R Jones
(74) *Attorney, Agent, or Firm* — ESPLIN & ASSOCIATES, PC

(57) ABSTRACT

An image capture device may experience motion while capturing a video. A video clip may be generated from the video. The beginning of the video clip may be identified based on acceleration of the image capture device during capture of the video, while the ending of the video clip may be identified based on speed of the image capture device during capture of the video.

20 Claims, 5 Drawing Sheets

SYSTEMS AND METHODS FOR IDENTIFYING EVENTS IN VIDEOS

FIELD

This disclosure relates to identifying events in a video using speed and acceleration of an image capture device.

BACKGROUND

An image capture device may be used to capture a video of an activity. Only small portions of the video may include parts of the activity that are of interest to users. Manually reviewing and editing videos to pull out the interesting portions of the video may be difficult and time consuming.

SUMMARY

This disclosure relates to identifying events in videos. Video information, position information, and/or other information may be obtained. The video information may define a video having a progress length. The position information may characterize speed and acceleration of an image capture device during capture of the video. A beginning moment within the progress length may be identified for a beginning of a video clip based on the acceleration of the image capture device during the capture of the video and/or other information. An ending moment within the progress length may be identified for an ending of the video clip based on the speed of the image capture device during the capture of the video and/or other information. The video clip may be generated to include a portion of the progress length from the beginning moment to the ending moment.

A system for identifying events in videos may include one or more electronic storage, processor, and/or other components. The electronic storage may store video information, information relating to a video, position information, information relating to speed and acceleration of an image capture device during capture of the video, information relating to a video clip, and/or other information.

The processor(s) may be configured by machine-readable instructions. Executing the machine-readable instructions may cause the processor(s) to facilitate identifying events in videos. The machine-readable instructions may include one or more computer program components. The computer program components may include one or more of a video information component, position information component, beginning moment component, ending moment component, generation component, and/or other computer program components.

The video information component may be configured to obtain video information and/or other information. The video information may define a video having a progress length. The video having the progress length may be captured by an image capture device.

The position information component may be configured to obtain position information and/or other information. The position information may characterize speed and acceleration of the image capture device during capture of the video. In some implementations, the position information may characterize the acceleration of the image capture device along three orthogonal directions. In some implementations, the position information may characterize the speed of the image capture device based on changes in GPS location of the image capture device.

The beginning moment component may be configured to identify a beginning moment within the progress length for a beginning of a video clip. The beginning moment may be identified based on the acceleration of the image capture device during the capture of the video and/or other information. In some implementations, the beginning moment within the progress length for the beginning of the video clip may be identified further based on the speed of the image capture device during the capture of the video.

In some implementations, the beginning moment within the progress length for the beginning of the video clip may be identified based on a norm of the acceleration of the image capture device along the three orthogonal directions. In some implementations, the beginning moment within the progress length for the beginning of the video clip may be identified based on a smoothed curve of the norm of the acceleration of the image capture device along the three orthogonal directions. In some implementations, the beginning moment within the progress length for the beginning of the video clip may be identified based on a duration over which the smoothed curve exceeds a threshold value.

The ending moment component may be configured to identify an ending moment within the progress length for an ending of the video clip. The ending moment may be identified based on the speed of the image capture device during the capture of the video and/or other information. In some implementations, the ending moment within the progress length for the ending of the video clip may not identified based on the acceleration of the image capture device during the capture of the video.

In some implementations, the identification of the beginning moment based on the acceleration of the image capture device and the identification of the ending moment based on the speed of the image capture device may be performed based on detection of a surfing activity within the video and/or other information. In some implementations, the surfing activity within the video may be detected based on classification of visual content within the video and/or other information.

The generation component may be configured to generate the video clip. The video clip may be generated to include a portion of the progress length from the beginning moment to the ending moment.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
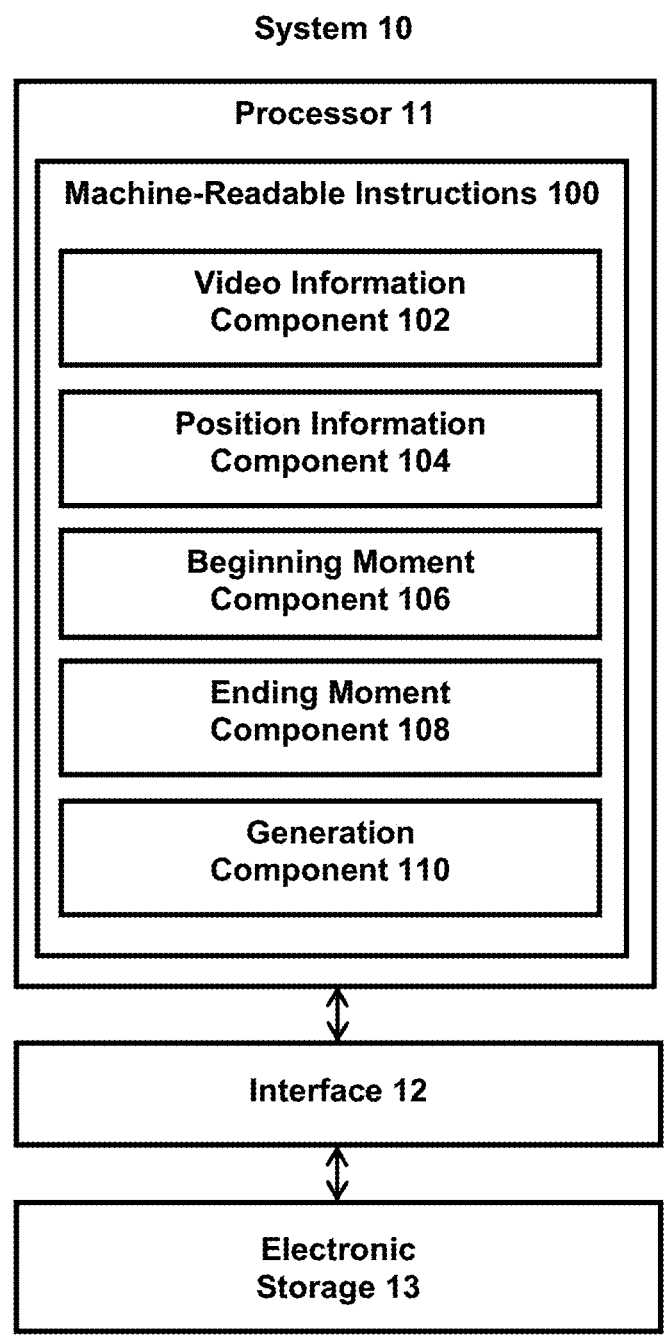
FIG. 1 illustrates an example system for identifying events in videos.

FIG. 1 illustrates a system 10 for identifying events in videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information, position information, and/or other information may be obtained by the processor 11. The video information may define a video having a progress length. The position information may characterize speed and acceleration of an image capture device during capture of the video. A beginning moment within the progress length may be identified for a beginning of a video clip by the processor 11 based on the acceleration of the image capture device during the capture of the video and/or other information. An ending moment within the progress length may be identified for an ending of the video clip by the processor 11 based on the speed of the image capture device during the capture of the video and/or other information. The video clip may be generated by the processor 11 to include a portion of the progress length from the beginning moment to the ending moment.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, position information, information relating to speed and acceleration of an image capture device during capture of the video, information relating to a video clip, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s), of the system 10 may be carried by the housing of the image capture device. The housing may carry other components, such as the processor 11 and/or the electronic storage 13.

Figure 3:
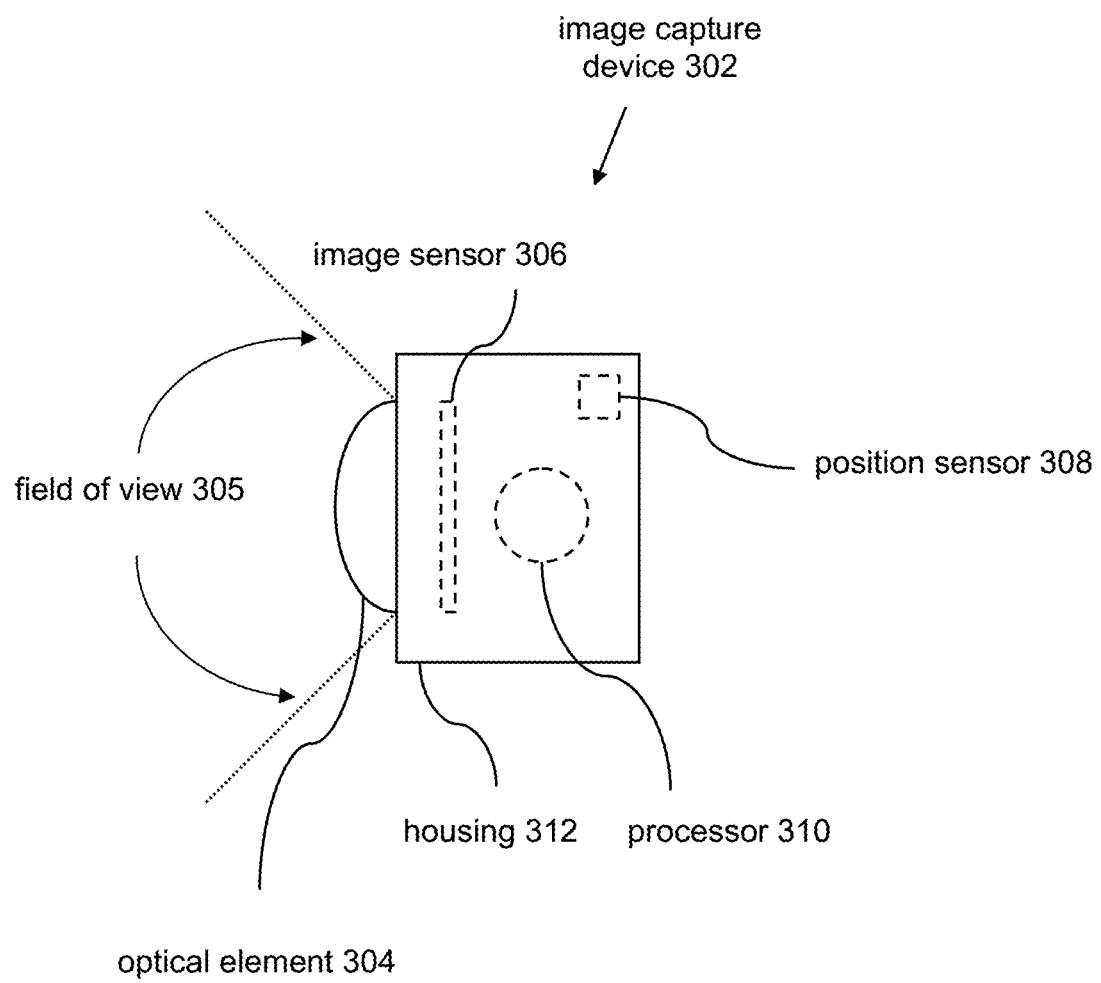
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing.

The housing 312 may carry (be attached to, support, hold, and/or otherwise carry) one or more of an optical element 304, an image sensor 306, a position sensor 308, a processor 310, and/or other components. One or more components of the image capture device 302 may be the same as, be similar to, and/or correspond to one or more components of the system 10. For example, the processor 310 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, one or more magnetometers, one or more global positioning system sensors, and/or other position sensors. The position sensor 308 may generate output signals conveying information that characterizes positions and/or motions of the position sensor 308 and/or device(s) carrying the position sensor 308, such as the image capture device 302 and/or the housing 308.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, speed, acceleration) during the capture duration.

In some implementations, the position information may include data from the position sensor (e.g., gyroscope data, accelerometer data, GPS data) with time stamps for visual content capture at different moments. For example, the position may include gyroscope data, accelerometer data, and/or GPS data for different/individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the position sensor 308 (e.g., change how experienced positions and/or motions is measured).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may be used capture a video of an activity. The position sensor 308 may be used to measure speed and acceleration of the image capture device during capture of the video. A beginning moment for a video clip may be identified in the video based on a norm of the acceleration of the image capture device along three orthogonal directions during the capture of the video. An ending moment for the video clip may be identified in the video based on the speed of the image capture device during the capture of the video. The ending moment for the video clip may not be identified in the video based on the acceleration of the image capture device during the capture of the video. The video clip may be generated to include a portion of the video from the beginning moment to the ending moment.

Referring back to FIG. 1, the processor 11 (or one or more components of the processor 11) may be configured to obtain information to facilitate removing commands from sound recordings. Obtaining information may include one or more of accessing, acquiring, analyzing, determining, examining, identifying, loading, locating, measuring, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate identifying events in videos. The machine-readable instructions 100 may include one or more computer program components. The machine-readable instructions 100 may include one or more of a video information component 102, position information component 104, beginning moment component 106, ending moment component 108, generation component 110, and/or other computer program components.

The video information component 102 may be configured to obtain video information and/or other information. Obtaining video information may include one or more of accessing, acquiring, analyzing, determining, examining, identifying, loading, locating, measuring, opening, receiving, retrieving, reviewing, selecting, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more sensors, electronic storage of a device accessible via a network, and/or other locations. The video information component 102 may obtain video information from one or more hardware components (e.g., an image sensor) and/or one or more software components (e.g., software running on a computing device).

Video information may be obtained during acquisition of the video and/or after acquisition of the video. For example, the video information component 102 may obtain video information defining a video while the video is being captured by one or more image sensors. The video information component 102 may obtain video information defining a video after the video has been captured and stored in memory (e.g., the electronic storage 13).

In some implementations, the video information component 102 may obtain video information based on user interaction with a user interface/application (e.g., video/image editing application, video player/image viewer application), and/or other information. For example, a user interface/application may provide option(s) for a user to select one or more videos from which video clip(s) are to be generated. The video information defining the video may be obtained based on the user's selection of the video through the user interface/application. Other selections of video for retrieval of video information are contemplated.

The video information may define a video having a progress length. The video having the progress length may be captured by an image capture device. The progress length of the video may be same as and/or determined based on the capture duration(s). For example, the progress length of the video may be the same as the capture duration(s) (total length of capture duration(s)) based on the capture rate (e.g., capture FPS) being the same as the playback rate (e.g., playback FPS). The progress length of the video may be different from the capture duration(s) based on the capture rate being different form the playback rate (e.g., fraction/multiple of the total length of the capture duration(s)).

The video information may define a video by including information that defines one or more content, qualities, attributes, features, and/or other aspects of the content of the video. The video information may include visual information, audio information, and/or other information. Other types of video information are contemplated.

The position information component 104 may be configured to obtain position information and/or other information. Obtaining position information may include one or more of accessing, acquiring, analyzing, determining, examining, identifying, loading, locating, measuring, opening, receiving, retrieving, reviewing, selecting, storing, and/or otherwise obtaining the position information. The position information component 104 may obtain position information from one or more locations. For example, the position information component 104 may obtain position information from a storage location, such as the electronic storage 13, electronic storage of information and/or signals generated by one or more sensors, electronic storage of a device accessible via a network, and/or other locations. The position information component 104 may obtain position information from one or more hardware components (e.g., a position sensor) and/or one or more software components (e.g., software running on a computing device).

The position information component 104 may obtain position information for a video while the video is being captured by the image capture device. The position information component 104 may obtain position information for the video during generation of the position output signal by the position sensor. The position information component 104 may obtain position information for the video after the video/position information has been captured and stored in memory (e.g., the electronic storage 13).

The position information may characterize speed and acceleration of the image capture device during capture of the video. The position information may characterize speed and acceleration of the image capture device that captured the video during the capture duration. The position information may characterize speed and acceleration of the image capture device as a function of progress through the capture of the video. The position information may describe and/or define the speed and acceleration of the image capture device at different moments within the capture duration. The position information may specify values of speed and acceleration of the image capture device at different moments within the capture duration and/or specify values from which the speed and acceleration of the image capture device may be determined. For example, the position information may specify values of acceleration measured by an accelerometer during the capture duration. The position information may specify values that define GPS location of the image capture device during the capture duration. The position information may characterize the speed of the image capture device based on changes in the GPS location of the image capture device during the capture duration.

In some implementations, the position information may characterize the acceleration of the image capture device along three orthogonal directions. For example, the position information may characterize the acceleration of the image capture device along three orthogonal axes (e.g., three Cartesian coordinate axes) of an accelerometer.

Figure 4:
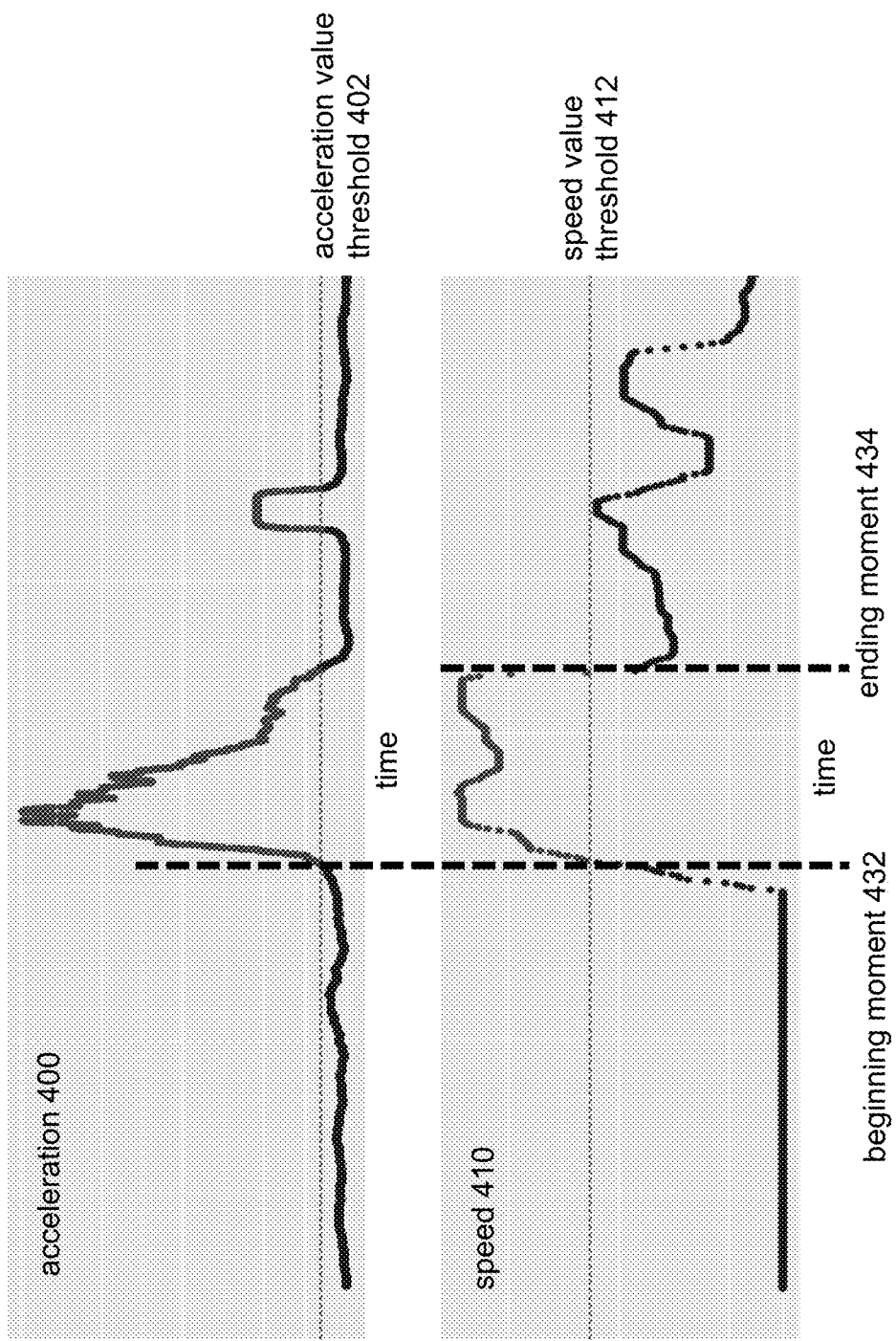
FIG. 4 illustrates example acceleration and speed of an image capture device.

FIG. 4 illustrates example acceleration 400 and speed 410 of an image capture device. The acceleration 400 and speed 410 of the image capture device may be measured using one or more position sensors of the image capture device. The acceleration 400 and speed 410 of the image capture device may be measured during capture of a video by the image capture device. The acceleration 400 shown in FIG. 4 may be a norm of the acceleration of the image capture device along three orthogonal directions (squared root of sum of squared acceleration along X-axis, Y-axis, and Z-axis). The acceleration 400 and the speed 410 shown in FIG. 4 may be a smoothed curve of the acceleration and speed measured by the position sensor(s). One or more filters may be applied to remove noise from the speed and/or the acceleration measured during the capture of the video by the image capture device to generate the curves of the acceleration 400 and the speed 410.

The beginning moment component 106 may be configured to identify a beginning moment within the progress length for a beginning of a video clip. Identifying the beginning moment may include ascertaining, choosing, determining, selecting, and/or otherwise identifying the beginning moment. The beginning moment within the progress length of the video may refer to the moment at which the video clip may start. The beginning moment within the progress length of the video may refer to a starting moment (e.g., starting point in time, starting frame) within the video from which the video clip generation may be started. In some implementations, multiple beginning moments may be identified within the progress length of the video. Multiple beginning moments may be identified for generation of multiple video clips from the video.

The beginning moment may be identified based on the acceleration of the image capture device during the capture of the video and/or other information. That is, the acceleration of the image capture device that captured the video may be used to identify the beginning moment for the video clip.

In some implementations, the beginning moment within the progress length for the beginning of the video clip may be identified further based on the speed of the image capture device during the capture of the video. Both the acceleration and the speed of the image capture device that captured the video may be used to identify the beginning moment for the video clip. The beginning moment component 106 may use the values of acceleration (and speed), changes in the values of acceleration (and speed), and/or other aspects of the values of acceleration (and speed) to identify the beginning moment.

In some implementations, the beginning moment within the progress length for the beginning of the video clip may be identified based on a norm of the acceleration of the image capture device along three orthogonal directions. For example, the beginning moment may be identified based on values of the squared root of sum of squared acceleration along X-axis, Y-axis, and Z-axis. Using the norm of the acceleration of the image capture device along three orthogonal directions may enable changes in tilt/position of the image capture device to be factored in the beginning moment identification.

In some implementations, the beginning moment within the progress length for the beginning of the video clip may be identified based on a smoothed curve of the norm of the acceleration of the image capture device along the three orthogonal directions. For example, a temporal smoothing (temporal averaging) may be applied to the norm of the acceleration curve to remove noise from the signal. In some implementations, the beginning moment within the progress length for the beginning of the video clip may be identified based on a duration over which the smoothed curve exceeds a threshold value (acceleration value threshold). For example, the beginning moment may be identified at a particular moment within the progress length based on the particular moment being at the beginning, within, or the end of duration in which the smoothed curve exceeds the acceleration value threshold.

The duration for which the smoothed curve exceeds the acceleration threshold may need to exceed a threshold duration (acceleration duration threshold) for the beginning moment to be identified. For instance, portions of the video with short bursts of high acceleration (e.g., the smoothed curve exceeding the acceleration value threshold for a duration less than the threshold duration) may not qualify as the beginning moment. Portions of the video with sustained high acceleration (e.g., the smoothed curve exceeding the acceleration value threshold for a duration more than the threshold duration) may qualify as the beginning moment.

In some implementations, the beginning moment within the progress length for the beginning of the video clip may be identified based on both the acceleration and the speed of the image capture device. For example, in addition to requiring the acceleration value to exceed the acceleration threshold, the speed of the image capture device may need to exceed a threshold value (speed value threshold) to identify a moment as the beginning moment. Smoothing (e.g., temporal smoothing) may be applied to the speed of the image capture device. Use of both the acceleration and speed may enable more accurate identification of the beginning moment for the video clip. For example, use of both the acceleration and speed may enable more accurate identification of the beginning of a particular activity (e.g., beginning of surfing, take-off), than use of just the acceleration or speed.

The speed of the image capture device may need to exceed the speed value threshold for a threshold duration (speed duration threshold) for the beginning moment to be identified. For example, the beginning moment may be identified based on detection of a portion of the video in which the image capture device experienced high acceleration (exceeding the acceleration value threshold) with high speed (exceeding the speed value threshold) for more than a duration of time (speed duration threshold). Other identification of the beginning moment is contemplated.

For example, referring to FIG. 4, two parts of the progress length of the video may include the acceleration 400 of the image capture device exceeding an acceleration value threshold 402. The first part may also include the speed 410 of the image capture device exceeding a speed value threshold 412 for longer than a speed duration threshold. That is, the length of time over which the speed 410 of the image capture device exceed the speed value threshold 412 may be longer than the speed duration threshold. Based on these speed and acceleration characteristics of the image capture device, a beginning moment 432 may be identified with respect to the first part. The second part may not include the speed 410 of the image capture device exceeding the speed value threshold 412. The speed 410 of the image capture device may be below the speed value threshold 412. Based on these speed and acceleration characteristics of the image capture device, a beginning moment may not be identified with respect to the second part.

For instance, the video may have been captured during a surfing activity. The first part may include take-off and surfing, while the second part may include duck dive. Take-off and surfing may be of interest to users while duck dive may not be of interest to users. Use of both speed and acceleration may enable the take-off and surfing part of the video to be identified for generation of a video clip, while excluding the duck dive part of the video.

The ending moment component 108 may be configured to identify an ending moment within the progress length for an ending of the video clip. Identifying the ending moment may include ascertaining, choosing, determining, selecting, and/or otherwise identifying the ending moment. The ending moment within the progress length of the video may refer to the moment at which the video clip may end. The ending moment within the progress length of the video may refer to an ending moment (e.g., ending point in time, ending frame) within the video in which the video clip generation may be ended. In some implementations, multiple ending moments may be identified within the progress length of the video. Multiple ending moments may be identified for generation of multiple video clips from the video.

The ending moment may be identified based on the speed of the image capture device during the capture of the video and/or other information. That is, the speed of the image capture device that captured the video may be used to identify the ending moment for the video clip. The ending moment within the progress length for the ending of the video clip may not identified based on the acceleration of the image capture device during the capture of the video. For example, while both the acceleration and speed of the image capture device may be used to identify the beginning moment, only the speed of the image capture device may be used to identify the ending moment. The ending moment component 108 may use the values of speed, and/or other aspects of the values of speed to identify the ending moment. Use of speed and not acceleration may enable more accurate identification of the ending moment for the video clip. For example, use of speed and not acceleration may enable more accurate identification of the ending of a particular activity (e.g., ending of surfing), than use of acceleration or speed and acceleration.

In some implementations, the ending moment within the progress length of the ending of the video clip may be identified based on the speed of the image capture device falling below a threshold value (speed value threshold). The ending moment may be identified as a moment at which the speed of the image capture device falls below the threshold value. The speed value threshold for identifying the ending moment may be the same as or different from the speed value threshold for identifying the beginning moment.

For example, referring to FIG. 4, an ending moment 434 may be identified based on the speed 410 of the image capture falling below the speed value threshold 412. While a single speed value threshold 412 is shown in FIG. 4, this is merely as an example and is not meant to be limiting. In some implementations, separately speed value thresholds may be used for identifying beginning moment and identifying ending moment.

Such identification of beginning moments and ending moments for video clips may enable quick and automatic generation of video clips from longer videos. Such identification of beginning moments and ending moments for video clips may enable automatic generation of video clips that include interesting moments from the videos.

For example, for a surfing activity in which the image capture device is being carried (be attached to, supported, held, and/or otherwise carried) by a person/surfing equipment, such identification of beginning moments and ending moments may include surfing actions (e.g., take-off, surfing) in the video clips while excluding other actions (e.g., waiting for wave, paddling, duck dive, falls, take-off attempts) from the video clips.

In some implementations, the identification of the beginning moment based on the acceleration of the image capture device (and in some implementations the speed of the image capture device) and the identification of the ending moment based on the speed of the image capture device (and not the acceleration of the image capture device) may be performed based on detection of a surfing activity within the video and/or other information. In some implementations, the surfing activity within the video may be detected based on classification of visual content within the video (by a computing device) and/or other information. In some implementations, the surfing activity within the video may be detected based on user input. In some implementations, the identification of the beginning moment based on the acceleration of the image capture device (and in some implementations the speed of the image capture device) and the identification of the ending moment based on the speed of the image capture device (and not the acceleration of the image capture device) may be performed based on user activation of an editing option for the video, such as user activation of a Surf Editing option for the video.

Use of the acceleration of the image capture device (and in some implementations the speed of the image capture device) to identify the beginning moment for a video clip and use of the speed of the image capture device (and not the acceleration of the image capture device) may enable generation of video clips for other types of activities captured within videos. For example, same/similar logic may be employed to identify beginning moments and ending moments for video clips of other sporting activities, such as mountain biking or skiing. In some implementations, separate values of thresholds and/or durations may be employed for different sporting activities. For example, acceleration and speed value thresholds may be used to identify the beginning of a jumping activity, and a speed value threshold may be used to identify the ending of the jumping activity. The duration for which the speed of the image capture device may exceed the speed value threshold may be less for the jumping activity than the surfing activity.

In some implementations, specific values of thresholds and/or durations may be automatically applied for specific types of activities. The type of activity depicted within the video may be received from the user and/or determined from classification of visual content within the video by a computing device. The values of thresholds and/or durations corresponding to the identified activity may be used to identify the beginning moment and the ending moment.

The generation component 110 may be configured to generate one or more video clips. A video clip may refer to a video generated from a longer video. A video clip may include less than the entire progress length of the video. A video clip may be generated to include a portion of the progress length from a beginning moment (identified by the beginning moment component 106) to an ending moment (identified by the ending moment component 108). Based on detection of multiple beginning moment and multiple ending moments within a single video, the generation component 110 may generate multiple video clips from the single video. In some implementations, the video clip may be generated to include other portions of the progress length. For example, the ending of the video clip may be extended before the beginning moment/beyond the ending moment, with fade-in/fade-out effect being applied to the start/end of the video clip.

Figure 5:
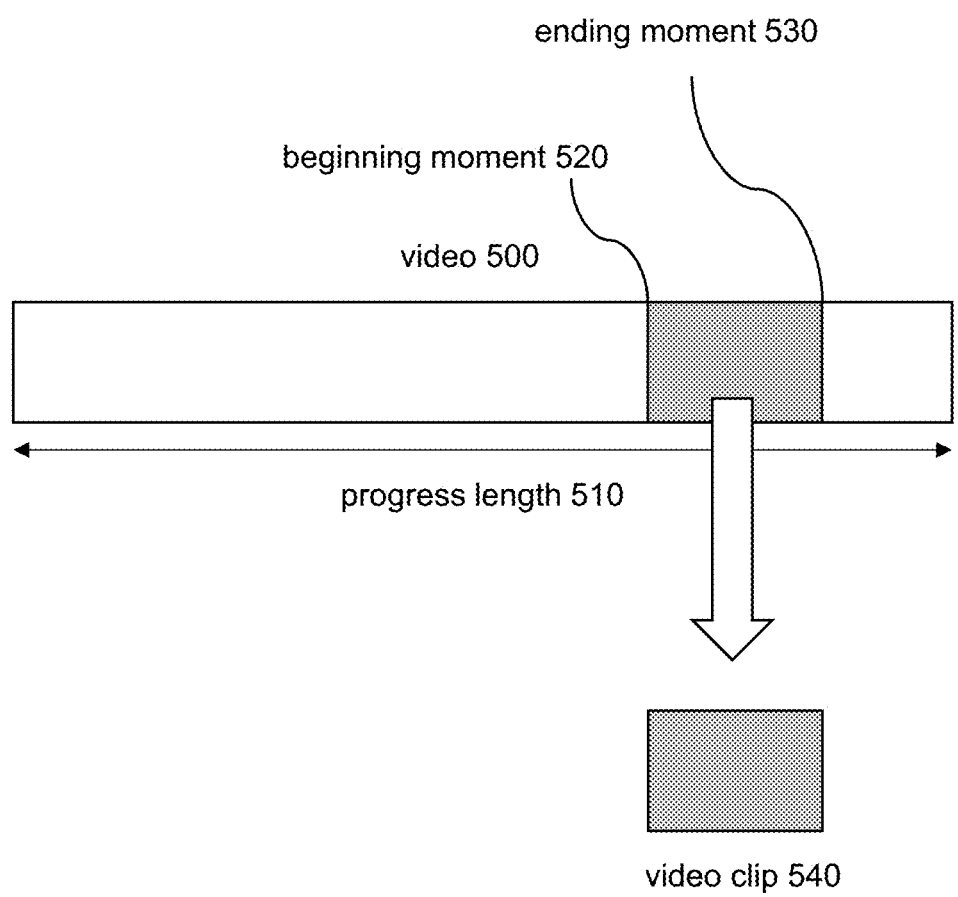
FIG. 5 illustrates example generation of a video clip.

FIG. 5 illustrates example generation of a video clip. A video 500 may have a progress length 510. A beginning moment 520 and an ending moment 530 may be identified within the progress length 510 of the video 500. A video clip 540 may be generated to include a portion of the progress length 510 from the beginning moment 520 to the ending moment 530. While a single video clip is shown to be generated from the video 500 in FIG. 5, this is merely as an example and is not meant to be limiting. In some implementations, multiple video clips may be generated from a single video.

In some implementations, a video clip between a beginning moment and an ending moment may be generated based on the duration between the beginning moment and the ending moment being greater than a threshold duration (video clip duration threshold). If the duration between the beginning moment and the ending moment is less than the video clip duration threshold, the event depicted between the beginning moment and the ending moment may be too short and the video clip may not be generated. If the beginning moment and the ending moment is greater than the video clip duration threshold, the event depicted between the beginning moment and the ending moment may be of sufficient length for generation of the video clip. For example, for a surfing activity, the minimum desired length of the video clip may be four or five seconds. The video clip duration threshold may be set to four or five seconds so that video clips of shorter durations are not generated. Use of other values for the video clip duration threshold is contemplated.

A video clip may be generated as encoded video clip (e.g., encoded video file) and/or as instructions for presenting the video clip. For example, a video clip may be generated as an encoded video in a video file, and the video file may be opened in a video player for presentation on one or more displays. A video clip may be generated as instructions identifying one or more parts of the video that are included in the video clip (e.g., beginning moment, ending moment, moments between the beginning moment and the ending moment), and a video player may use the instructions to retrieve the part(s) of the video for presentation on display(s).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
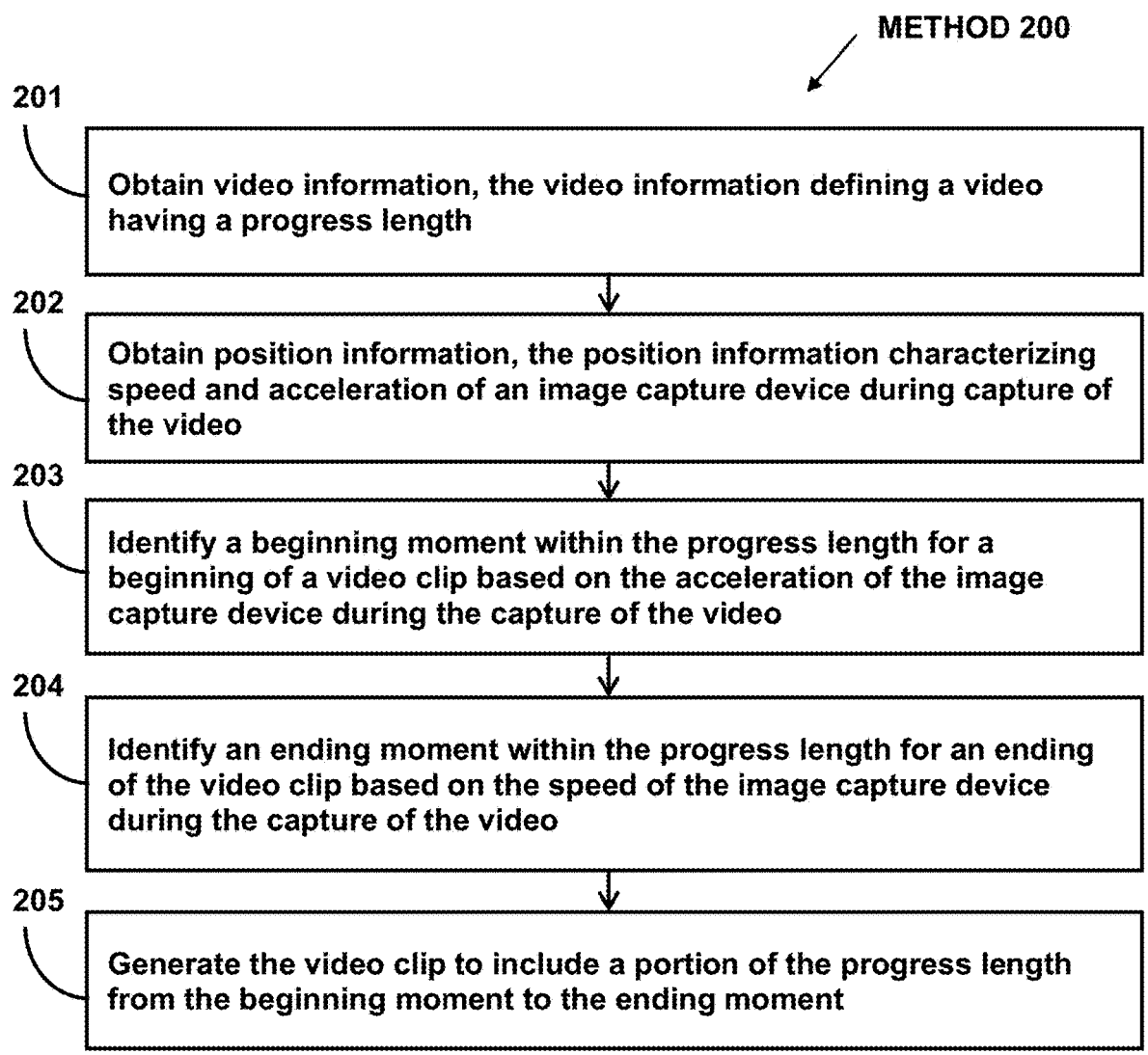
FIG. 2 illustrates an example method for identifying events in videos.

FIG. 2 illustrates method 200 for identifying events in videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video having a progress length. In some implementations, operation 201 may be performed by a processor component the same as or similar to the video information component 102 (Shown in FIG. 1 and described herein).

At operation 202, position information and/or other information may be obtained. The position information may characterize speed and acceleration of an image capture device during capture of the video. In some implementations, operation 202 may be performed by a processor component the same as or similar to the position information component 104 (Shown in FIG. 1 and described herein).

At operation 203, a beginning moment within the progress length may be identified for a beginning of a video clip based on the acceleration of the image capture device during the capture of the video and/or other information. In some implementations, operation 203 may be performed by a processor component the same as or similar to the beginning moment component 106 (Shown in FIG. 1 and described herein).

At operation 204, an ending moment within the progress length may be identified for an ending of the video clip based on the speed of the image capture device during the capture of the video and/or other information. In some implementations, operation 204 may be performed by a processor component the same as or similar to the ending moment component 108 (Shown in FIG. 1 and described herein).

At operation 205, the video clip may be generated to include a portion of the progress length from the beginning moment to the ending moment. In some implementations, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for identifying events in videos, the system comprising:
    one or more physical processors configured by machine-readable instructions to:
        obtain video information, the video information defining a video having a progress length;
        obtain position information, the position information characterizing speed and acceleration of an image capture device during capture of the video, wherein the position information characterizes the acceleration of the image capture device along three orthogonal directions;
        identify a beginning moment within the progress length for a beginning of a video clip based on a norm of the acceleration of the image capture device along the three orthogonal directions during the capture of the video;
        identify an ending moment within the progress length for an ending of the video clip based on the speed of the image capture device during the capture of the video, wherein the ending moment within the progress length for the ending of the video clip is not identified based on the acceleration of the image capture device during the capture of the video; and
        generate the video clip to include a portion of the progress length from the beginning moment to the ending moment.

2. The system of claim 1, wherein the beginning moment within the progress length for the beginning of the video clip is identified based on a duration over which a smoothed curve of the norm of the acceleration of the image capture device along the three orthogonal directions exceeds a threshold value.

3. The system of claim 2, wherein the identification of the beginning moment based on the acceleration of the image capture device and the identification of the ending moment based on the speed of the image capture device is performed based on detection of a surfing activity within the video.

4. The system of claim 3, wherein the surfing activity within the video is detected based on classification of visual content within the video.

5. A system for identifying events in videos, the system comprising:
    one or more physical processors configured by machine-readable instructions to:
        obtain video information, the video information defining a video having a progress length;
        obtain position information, the position information characterizing speed and acceleration of an image capture device during capture of the video, wherein the position information characterizes the acceleration of the image capture device along three orthogonal directions;
        identify a beginning moment within the progress length for a beginning of a video clip based on the acceleration of the image capture device during the capture of the video, wherein the beginning moment within the progress length for the beginning of the video clip is identified based on a norm of the acceleration of the image capture device along the three orthogonal directions;
        identify an ending moment within the progress length for an ending of the video clip based on the speed of the image capture device during the capture of the video; and
        generate the video clip to include a portion of the progress length from the beginning moment to the ending moment.

6. The system of claim 5, wherein the beginning moment within the progress length for the beginning of the video clip is identified further based on the speed of the image capture device during the capture of the video.

7. The system of claim 5, wherein the ending moment within the progress length for the ending of the video clip is not identified based on the acceleration of the image capture device during the capture of the video.

8. The system of claim 5, wherein the beginning moment within the progress length for the beginning of the video clip is identified based on a smoothed curve of the norm of the acceleration of the image capture device along the three orthogonal directions.

9. The system of claim 8, wherein the beginning moment within the progress length for the beginning of the video clip is identified based on a duration over which the smoothed curve exceeds a threshold value.

10. The system of claim 5, wherein the position information characterizes the speed of the image capture device based on changes in GPS location of the image capture device.

11. The system of claim 5, wherein the identification of the beginning moment based on the acceleration of the image capture device and the identification of the ending moment based on the speed of the image capture device is performed based on detection of a surfing activity within the video.

12. The system of claim 11, wherein the surfing activity within the video is detected based on classification of visual content within the video.

13. A method for identifying events in videos, the method performed by a computing system including one or more processors, the method comprising:

obtaining, by the computing system, video information, the video information defining a video having a progress length;

obtaining, by the computing system, position information, the position information characterizing speed and acceleration of an image capture device during capture of the video, wherein the position information characterizes the acceleration of the image capture device along three orthogonal directions;

identifying, by the computing system, a beginning moment within the progress length for a beginning of a video clip based on the acceleration of the image capture device during the capture of the video, wherein the beginning moment within the progress length for the beginning of the video clip is identified based on a norm of the acceleration of the image capture device along the three orthogonal directions;

identifying, by the computing system, an ending moment within the progress length for an ending of the video clip based on the speed of the image capture device during the capture of the video; and generating, by the computing system, the video clip to include a portion of the progress length from the beginning moment to the ending moment.

14. The method of claim 13, wherein the beginning moment within the progress length for the beginning of the video clip is identified further based on the speed of the image capture device during the capture of the video.

15. The method of claim 13, wherein the ending moment within the progress length for the ending of the video clip is not identified based on the acceleration of the image capture device during the capture of the video.

16. The method of claim 13, wherein the beginning moment within the progress length for the beginning of the video clip is identified based on a smoothed curve of the norm of the acceleration of the image capture device along the three orthogonal directions.

17. The method of claim 16, wherein the beginning moment within the progress length for the beginning of the video clip is identified based on a duration over which the smoothed curve exceeds a threshold value.

18. The method of claim 13, wherein the position information characterizes the speed of the image capture device based on changes in GPS location of the image capture device.

19. The method of claim 13, wherein the identification of the beginning moment based on the acceleration of the image capture device and the identification of the ending moment based on the speed of the image capture device is performed based on detection of a surfing activity within the video.

20. The method of claim 19, wherein the surfing activity within the video is detected based on classification of visual content within the video.

* * * * *